United States Patent [19]
Duan et al.

[11] Patent Number: 5,923,656
[45] Date of Patent: Jul. 13, 1999

[54] SCALABLE BROAD BAND INPUT-QUEUED ATM SWITCH INCLUDING WEIGHT DRIVEN CELL SCHEDULER

[75] Inventors: Haoran Duan, Urbana; John W. Lockwood, Savoy; Sung Mo Kang, Champaign, all of Ill.

[73] Assignee: Board of Trustees of the University of Illinois, Urbana, Ill.

[21] Appl. No.: 08/735,169

[22] Filed: Oct. 22, 1996

[51] Int. Cl.⁶ ........................................................ H04J 3/02
[52] U.S. Cl. .......................... 370/395; 370/412; 370/416
[58] Field of Search ................................... 370/412, 414, 370/416, 468, 413, 415, 395

[56] References Cited

U.S. PATENT DOCUMENTS

| | | | |
|---|---|---|---|
| 5,126,999 | 6/1992 | Munter et al. | 370/412 |
| 5,491,691 | 2/1996 | Shtayer et al. | 370/61 |
| 5,499,238 | 3/1996 | Shon | 370/60 |
| 5,745,489 | 4/1998 | Diaz et al. | 370/60 |

OTHER PUBLICATIONS

"Achieving 100% Throughput in an Input–Queued Switch", Mckeown et al. No date.

"The Performance Analysis and Implementation of an Input Access Scheme in a High–Speed Packet Switch", Mehmet–Ali et al., IEEE Transactions on Communication, vol. 42, No., 12, Dec. 1994.

"Scheduling cells in an input–queued switch", McKeown et al., IEE Electronics Letters Online, Dec. 9, 1993, vol. 29, No. 25, pp. 2174–2175.

"A 1.5 Gb/s 8×8 Cross–Connect Switch Using a Time Reservation Algorithm" Matsunaga et al., IEEE Journal On Selected Areas in Communications, vol. 9, No. 8, Oct. 1991, pp. 1308–1317.

"Parallel Contention Resolution Control For Input Queueing ATM Switches", Obara et al., Electronics Letters, Apr. 23, 1992, vol. 28, No. 9, pp. 838–839.

"Optimum Architecture For Input Queuing ATM Switches", H. Obara, Electronics Letters, Mar. 28, 1991, vol. 27, No. 7, pp. 555–557.

*Primary Examiner*—Michael Horabik
*Assistant Examiner*—Kevin C. Harper
*Attorney, Agent, or Firm*—Greer, Burns & Crain, Ltd.

[57] ABSTRACT

An asynchronous mode transfer (ATM) switch conducting switching based upon the calculation of weights for entries corresponding to cells in an input queue to achieve a high throughput rate which avoids head of line blocking. The switch includes a cell scheduler driven by the iterative resolution of a traffic matrix formed by highest priority entries for each of a plurality of output ports queued in each of a plurality input queues each having separate virtual queues corresponding to the output ports. Conflicts in the matrix are resolved according to weight so that one entry per one row is chosen to be transmitted in parallel. Selection of winning entries from among a group of conflicting entries during any step are resolved by selecting the heaviest weighted entry and leaving the remaining ports maximum satisfactory transmission opportunities. The input queue communicates with the cell scheduler to assign priority level entries corresponding to highest priority cells which are queued in the input queue for each output port. The calculated weight for each entry during an iteration is a function of its priority level and the priority level of all other entries in a common row and column. A subsequent iteration is conducted without the winner and without all other entries in the same row and column as the winner.

27 Claims, 9 Drawing Sheets

X:a_ij>0, i.e. cells exist for switching

SCALABLE BROAD BAND INPUT-QUEUED ATM SWITCH INCLUDING WEIGHT DRIVEN CELL SCHEDULER

The present invention relates generally to a switching apparatus for conducting an efficient scheduling of ATM (asynchronous transfer mode) cells to resolve contentions in a cell traffic matrix, formed from a highest priority set of input queued cells. According to the present invention, weights are assigned to each entry in the traffic matrix by a function that depends upon other cell entries in common rows and columns. The cell scheduler communicates with the input queue so that links between input and output ports are used efficiently, and conflicts in the matrix are successively resolved to maximize sufficient remaining opportunities for the remaining ports for each set of highest priority queued cells. The scheduler is able to consider cells for multiple destination ports in a single scheduling process, thereby eliminating head of line blocking problems. The invention is generally applicable to ATM switches, such as those used in both wide area networks (WANs) and local area networks (LANs).

BACKGROUND OF THE INVENTION

ATM is emerging as the universal standard for network communication and has been designated by the CCITT as the multiplexing and switching technology for the Broadband Integrated Services Digital Network (B-ISDN). ATM was designed to allow interchange of various types of information irrespective of the type of information or the type of system which issues or receives the information. The ATM technology must also accommodate various types of end-networks, at various speeds from the megabit per second to gigabit per second range. The ability to accommodate different speeds, data types, and physical mediums makes ATM multiplexing and switching a flexible technology which will accommodate future modifications of transmission mediums and data structures. Specific examples of present day LAN applications of the ATM communication architecture becoming more and more widespread in business and academic circles include workgroup ATM, involving client-server computing with high-end workstations and servers, backbone ATM, involving connection of existing hubs and routers through a network, and connective ATM, involving connection of a LAN to a WAN.

In ATM, all information is digitized and formed into small fixed-length packets, called cells, and transmitted over a network. The cells include data portions, and header portions including error codes and routing vectors. Fast switches using efficient architectures, or switching fabrics, are required to achieve practical wide-spread implementation of ATM technology.

The end goal of an ATM switch or network of switches is transmission of the cells from a source to a destination. In an ATM LAN architecture, the physical connections comprise point-to-point links between switches and/or hosts. Host ATM interfaces allow hosts to connect to the network, and local switches act as nodes of the network. In the local ATM switch, cells received from particular ports must be routed to designated destination ports. Two steps are required in the routing: queuing of received cells pending their scheduling to a destination port, and the scheduling of queued cells.

A performance degrading bottleneck is often caused during cell routing in the ATM switch. Conventional ATM switching architecture fails to take full advantage of the bandwidth provided by modem physical transmission media, such as optical fibers. The bandwidth of the memory used as the cell queue is typically the bottleneck. Most such ATM architectures cannot be scaled to provide aggregate throughput exceeding 100 Gb/s in a 32-port configuration.

Typically, the conventional ATM switch is an output-buffered or shared-memory structure. These have the disadvantage of imposing significant memory bandwidth requirements on cell buffering memory and the switch fabric. Input queued ATM switches, in contrast, impose minimal memory bandwidth requirements on the cell queue, allowing the potential bandwidth of the queue memory to be better utilized.

In any of those structures, the ATM switch includes a memory for cell queuing. The location of the cell storage memory is used to classify the switch as input-queued, output-queued, or shared memory. In a shared memory, throughput is limited by the access speed of the RAM, requiring two memory operations (read and write) per cell. Accordingly, the memory bandwidth is the primary limitation on total throughput. Throughput in the output-queued switches is also limited by the memory bandwidth because the output buffer must have a bandwidth equal to the aggregate throughput of the switch when cells are simultaneously received from every input port. Although the bandwidth demand is usually less, and techniques exist for reducing the demand on the switch fabric, the aggregate throughput still requires the buffer memory to be some limited multiple of the port link rate. Input-queued switches require the least memory bandwidth because each queue module is only required to buffer cells at the arrival rate of a single port, instead of a multiple or the aggregate arrival rate of the entire switch module. Thus, the input-queued switch architecture provides superior scalability, better suited to ultra-broadband ATM switches.

Bottlenecks still develop in conventional input-queued switches when queued cells are scheduled for transmission. Conventional input-queued switches utilize scheduling algorithms such as the round-robin matching switch algorithm which achieve approximately 58% utilization of throughput. Round robin switches operate in the following fashion. Unmatched inputs send requests to every output for which they have inputs. If an unmatched output receives a request, it chooses the request next appearing in a round-robin schedule beginning with the highest priority element. The output notifies each input whether or not a request was granted, and a pointer is incremented passed any granted input. A phenomena termed head-of-line (HOL) blocking occurs while the highest priority cell for each input blocks scheduling of remaining cells for each input.

One technique proposed to solve this defect is a neural network based cell scheduler, proposed in "The performance Analysis and Implementation of an Input Access Scheme in a High-Speed Packet Switch", IEEE Transactions on Communications, vol. 42, pp. 3189–3199, December 1994. While the neural network achieves additional throughput, its practical implementation is questionable because of the large number of neurons (square the number of input ports) and interconnections (cube the number of input ports) which are required. Further improvements are required to provide a practical and efficient inputrequired ATM switch which realizes high throughput and meets other practical requirements such as scalability, fast response time, and low circuit complexity having low transistor and interconnect counts.

Accordingly, it is an object of the present invention to provide an improved input-queued ATM switch having a high throughput potential and a practical, scalable hardware implementation.

Another object of the present invention is to provide an input-queued ATM switch that avoids head-of-line blocking and is capable of achieving nearly 100% bandwidth utilization.

An additional object of the present invention is to provide an input-queued ATM switch having separate queues for each of a plurality of input ports, each input queue maintaining separate virtual queues for a plurality of output ports, the switch having a cell scheduler which considers multiple cells corresponding to separate output ports received from each input queue in a single selection process.

A further object of the present invention is to provide an input-queued ATM switch including a matrix cell scheduling unit which provides a cell transmission schedule that fills a traffic matrix with queued entries and resolves conflicts to maximize transmission opportunities for remaining ports.

A still further object of the present invention is to provide an input-queued ATM switch including a matrix cell scheduling unit using a traffic matrix having a set of entries corresponding to assigned priority levels of highest priority level cells queued in an input port queue, and which successively chooses from the set of entries by assigning a weight to each entry that depends upon other remaining entries in a common row or column, choosing the heaviest entry in the traffic matrix, and reducing the traffic matrix upon each selection of the heaviest entry, to thereby resolve conflicts so that only one entry per row per column are selected.

Yet another object of the present invention is to provide an input-queued ATM switch including a multi-tag input queue buffer, that assigns priority levels to queued cells stored in randomly accessible cell rooms according to a predetermined function, maintains the priority levels as tags in order of their priority for each destination port, and which sends the highest priority tags for each destination port to the cell scheduler as entries corresponding to the highest priority queued set of cells, wherein the cell scheduler assigns weights to the entries depending on other entries originating from, or destined for, a common port, and which maximizes throughput by conducting an iterative search for the heaviest entry in a traffic matrix formed by the entries, and reducing the traffic matrix upon each selection of the heaviest entry, to thereby resolve conflicts so that only one entry per row per column are selected.

SUMMARY OF THE INVENTION

The above-listed objects are met or exceeded by the present asynchronous mode transmission switch. According to the switch of the present invention a unique cell scheduling algorithm is implemented in a switch which includes a cell scheduler that iteratively selects a transmission set of cells received from input ports to be transmitted to designated output ports by choosing cells having a highest calculated weight. The weight driven cell scheduler provides nearly 100% throughput while utilizing a destination sorting priority input queue that prevents head of line problems common to prior input queued techniques, including round-robin schedulers.

In a preferred embodiment, a plurality of input queues each respectively corresponding to an input port receive any cells from their respective input ports that are designated for transmission to the plurality of output ports. Each input queue orders the received groups of received cells in virtual queues for their corresponding output port by their priority. A calculated priority level is assigned to each virtual queue having cells based upon a priority function. This fuinction may be based upon one or more factors, such as the externally set priority included in the header of each cell, the age of the highest priority cell for each destination port, the length of the cell queue for each destination port, or other single or multiple factors deemed important. Each input queue assigns the priority level $a_{ij}$ to a received cell group and transmits the highest priority levels for each destination port to create a matrix of $a_{ij}$ entries corresponding to a particular queued set of cells to be resolved in a cell scheduler.

The cell scheduler conducts an iterative selection process to choose an optimal set of cells to be transmitted during a subsequent transmission cycle. Each step in the iterative selection process includes choosing an entry $a_{ij}$ in the cell scheduler having the highest calculated weight $w_{ij}$. The weight of any particular entry is a function of its priority level $a_{ij}$ and all other priority levels for entries in the cell scheduler which have an identical i or j designation, e.g. entries in a traffic matrix formed by the cell scheduler that exist in a common row or column of the traffic matrix. Importantly, the cell scheduler receives the $a_{ij}$ head entries for each virtual destination queue, allowing consideration of multiple cells from each input port during a single selection process. Multiple entries may be chosen during a single step if their weights are equal, higher than other weights in the matrix, and the entries do not share a common row or column. If multiple entries having a common row or column are found to have share the highest weight during any step, a random selection is conducted among those entries. Upon the selection of one or more entries during any step in the iteration, other entries sharing a common scheduler in the same row or column with the winning entries removed from further contention. Accordingly, the iteration terminates after a maximum of N iterations, where N is the smaller of the number of input ports or output ports. A separate tie-break process, and shifting steps having a maximum of 2N iterations, is executed by separate tie-break circuitry if any step resulted in conflicting entries, and the total iterations are therefore 3N. Preferably, the cell scheduler is constructed so that the 3N iterations correspond to a time period equal to the time necessary to send a transmission set of cells selected during a previous selection process, so that transmission of a previous set and selection of a next step occur in parallel.

A preferred embodiment of the cell scheduler includes an array of processing units and a tie-break circuit. Each processing unit corresponds to a particular input-output address where i designates the input port that an $a_{ij}$ entry corresponds to, and where j designates a destination port for the $a_{ij}$ entry. Each processing unit draws current from row and column current sources in proportion to its weight $w_{ij}$. A responsive voltage charger, such as a capacitor, develops a charge based upon the amount of current drawn until one or more processing units reaches a predetermined charge indicating that entries in the units have the highest weight. Absent the need for a tie-break process, the entry or entries having the highest weight (as indicated by their voltage charge) are selected for transmission, and any entries in a common row or column are removed from contention in the current selection process through a switch in the processing unit driven when any processing unit in a common row or column reaches the predetermined charge. If a tie-break is necessary, a winner is selected at random, and any entries remaining in a common row or column are removed from contention in the current selection process, including those having an identical weight to the winning entry.

BRIEF DESCRIPTION OF THE DRAWINGS

Other features, advantages and objects of the invention will be readily apparent to those skilled in the art by reference to the detailed description and drawings, of which.

DETAILED DESCRIPTION OF THE PREFERRED EMBODIMENT

Figure 1:
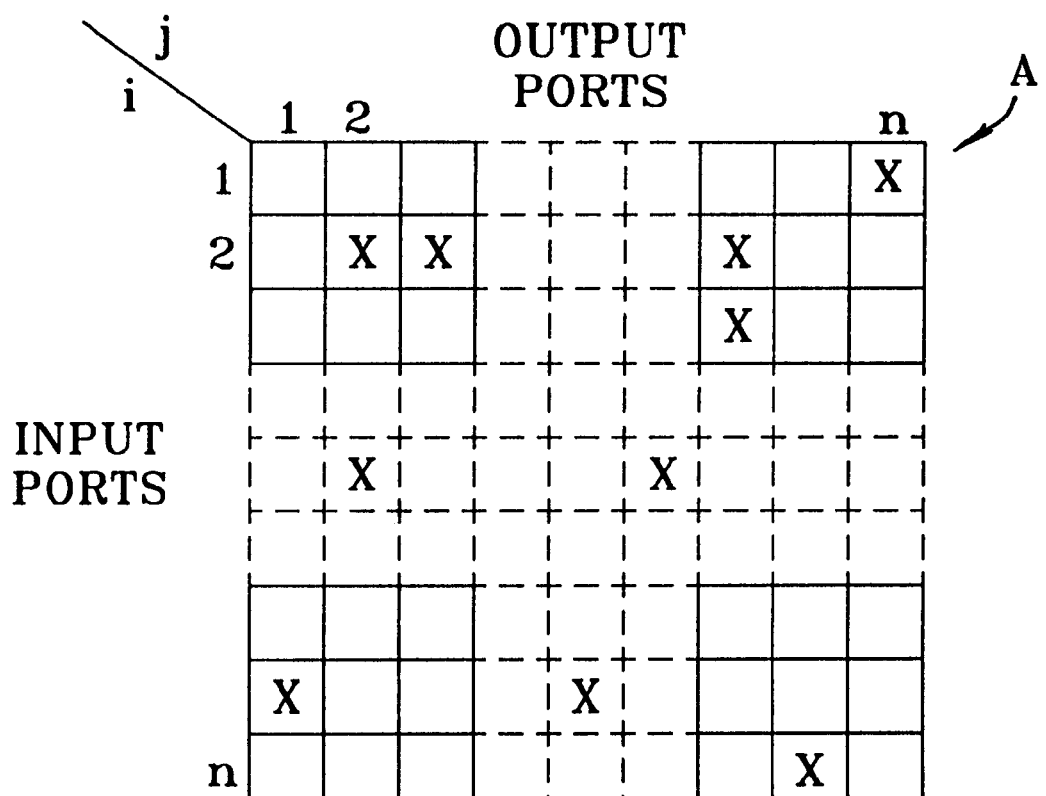
FIG. 1 is a logical diagram of a traffic matrix in an asynchronous transmission mode switch requiring scheduling of a priority set of queued cells for transmission to designated destination ports.

Referring now to FIG. 1, a traffic matrix A is illustrated in schematic form and includes a number of entries, designated X, corresponding to cells queued in input queues 12 (FIG. 2) that were received from a plurality of input ports i=N and must be routed to a designated output port j. Each input queue 12 corresponds to a particular input port and accepts all cells received for that particular input port that are designated in their cell headers as corresponding to any of the output ports j=M. The traffic matrix A schematically represents a particular ATM switching state where the entries X represent highest priority queued cells that must be scheduled for transmission to their designated output ports. The cell scheduler chooses a transmission set from the entries for transmission during a subsequent transmission timing while meeting the hardware constraint that no more than one cell per input port per output port can be selected for transmission during a single transmission timing. Thus, any entries X in the traffic matrix A which exist in the same row or column conflict, and cannot be transmitted during a single transmission timing. Each iteration in a selection process chooses a transmission set of cells to be sent during a subsequent transmission timing from a queued set of cells. In the matrix A formed by the present invention, multiple entries in each row may be considered during a single cell scheduling process.

The present invention is directed toward a unique input queue and cell scheduler arrangement which achieves nearly 100% throughput as an ATM switch by efficiently choosing a transmission set of cells. The input queue and cell scheduler ATM switch of the present invention may be transparently utilized as an ATM switch in a given network application, such as a LAN, with any number of known or yet to be created network protocols.

Input Queuing Including a Priority Sort By Destination Ports

Figure 2:
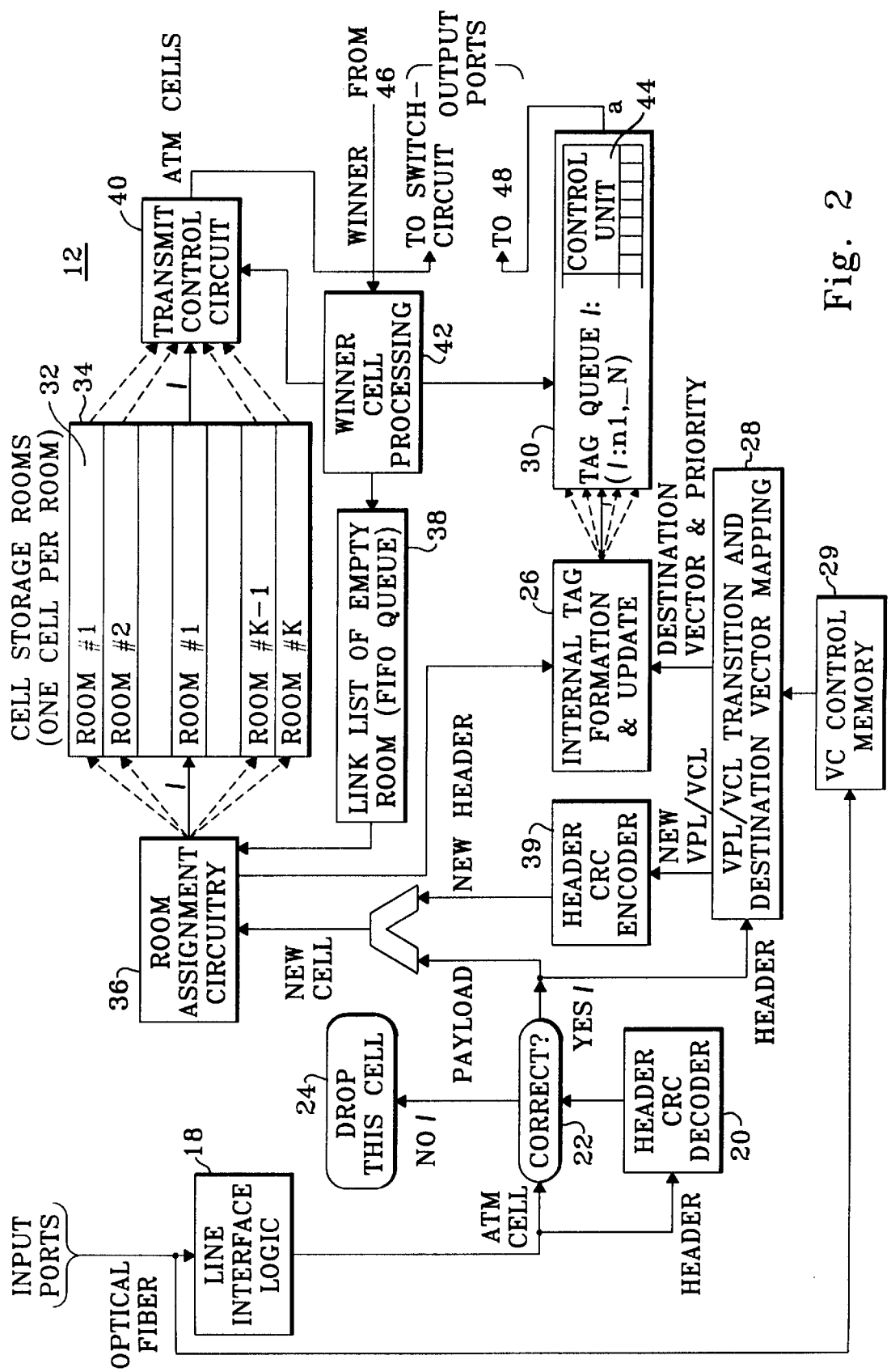
FIG. 2 is a block diagram of an input queue constructed in accordance with the present invention.

Referring now to FIGS. 2–3, the input queuing operation for the ATM switch of the present invention will be described. The switch of the present invention includes a plurality of parallel input queues 12 (a single queue is shown in FIG. 2) which each transmit, for use during a single selection process priority level entries $a_{ij}$ corresponding to the highest priority cell queued in each queue 12 for each of a plurality of output ports, to a cell scheduler 14. Multiple $a_{ij}$ entries are transmitted by each input queue for consideration if that queue has cells queued for separate destination ports. To facilitate this operation, each of the i=N parallel input queues 12 sorts cells into separate j=M virtual queues corresponding to the j=M output ports. The cell scheduler 14 includes N×M processing units 16 which conduct the iterative process to choose entries $a_{ij}$ corresponding to cells queued in the cell scheduler for transmission of selected cells during a next transmission cycle.

Cells received by any one of the parallel input queues 12 for a particular port j and having a higher priority than previously received cells for the output port j are queued in the jth virtual queue, ahead of previously received cells in the same virtual queue. For instance, if i=2 and j=2 for a cell received in the second input queue 12 (corresponding to the second input port), it places that cell in a virtual queue corresponding the second output port. If there is a previous cell in the virtual queue corresponding to the second output port then a priority comparison is made between the externally set priority value information sent with the cells (according to a given protocol) to determine which cell is to be considered in the next iteration conducted by the cell scheduler 14. This destination based input queue sorting removes the potential for the head-of-line blocking (HOL) common to round-robin based switches because the cell scheduler 14 is notified if each input port has cells for multiple output ports.

A traffic condition of each i, jth virtual queue is indicated by the integer priority level $a_{ij}$, where a value of 0 indicates an empty queue and the i, j subscript indicates a source port-destination port vector. The calculated priority level $a_{ij}$ may be a function of an externally set priority value, other-desired factor(s), or a combination of the external priority value and other cell transmission characteristics such as age of length. As an example, the following relationship might define $a_{ij}$ $$a_{ij} = \Sigma \text{Age}, \text{Lgth}_{ij}, \text{Pri};$$

where

Age is the age of the first cell in the i, j queue, $\text{Lgth}_{ij}$ is the length of the ijth virtual queue, and Pri is the externally set priority value of the head cell in the i, j queue. Values of $a_{ij}$ are updated for each destination port virtual queue after completion of each transmission of a previous set of cells to respective destination ports. The virtual sort is achieved when each of the input queues 12 separates cells from generated tags in a tag queue 30, which are logically linked with their stored cells. This permits a single cell memory resource 34 in each input queue 12 to be shared by all incoming cells, while conducting the virtual sorting operation using the cell tag queue 30. The tags each include a destination port indication and the address of their corresponding cells.

To maximize throughput, a single digit binary function for $a_{ij}$ may be used, where every destination queue is assigned a value of one if it has entries therein and each new tag is simply placed at the end of its respective jth queue when received. As will be apparent during discussion of the cell scheduler 14, this binary function for $a_{ij}$ results in the rows least flexible and columns of the traffic matrix being processed first, while leaving maximum opportunities for remaining cells.

FIG. 2 shows a logic diagram of one input queue 12 which receives cells from a single one of N input ports, and maintains M virtual queues using the tag queue 30, where M is the number of output ports. An ATM cell arrives via an optical fiber, or other suitable transmission media, via a conventional line interface logic circuit 18. A cyclic redundancy check (CRC) decoder decodes the CRC information in the cell's header and compares it to a calculated CRC value for the cell in a buffer 22. The cell is dropped 24 if the CRC check fails. The translation unit looks at the headers' unique VPI/cell identifier pair to decode a cell's destination vector priority level. Virtual circuit (VC) codes are stored in a VC control memory 29 when a connection is established for transmission of cells, and the translator 28 uses that information when cells arrive for an established connection to create the necessary outgoing VPI/VCI pair. The transmission priority value is also included in the VC memory 28 pursuant to an established connection's parameters.

When a cell passes the initial CRC check, it is stored in an available cell room 32 of the common cell memory 34, through an addressing unit 36 which assigns the cell to a next available room indicated in a first-in-first-out (FIFO) empty room queue 38, along with a newly calculated header including a CRC code and an outgoing VPI/VCI pair from a CRC encoder 39. Once a cell is transmitted from the memory 34 by the transmission control circuit 40 to its designated output port, the address of the cell room 32 is added to the end of the FIFO empty room queue 38 by a cell processing unit 42, so that the address of the cell room 32 may be used to store an additional cell received by the input queue 12. The cell processing unit 42 instructs the transmission control circuit 40 to route all stored cells indicated as winners by the cell scheduler during a single iterative cell selection process conducted by the cell scheduler 14, while also removing the associated tag and $a_{ij}$ value from the tag queue through ordering such operation to the tag queue's control unit 44.

In parallel to the storage of a newly arrived cell in a cell room 32 of the memory 34, the tag generator 26 generates a cell tag which indicates the cell's address in the memory 34, its destination port j, its externally-set priority value, and any other factors necessary for calculation of a priority level $a_{ij}$ for each virtual queue. For instance, when age is used in the $a_{ij}$ calculation, then the tag formation unit 26 would set an age of a newly arrived cell to be zero in the tag. If queue length is a factor in $a_{ij}$ then the tag formation unit orders the tag queue control unit to increment Lgth for the jth queue indicated by the destination port in the new cell's tag.

The tag queue control unit 44 and cell memory 34 maintain a three dimensional organization of cell tags. Cells are sorted according to their virtual circuit connection (VC), and tags by their priority value (a parameter of their connection establishment as received by the input queue 12 and stored in the VC memory 29), and their output port j.

The cell memory 34 is preferably a RAM having its memory space divided into the cell rooms 32, which are ATM cell sized memory units. Every cell room 32 has a corresponding address pointer linking it to the next cell room for any cell rooms 32 having cells from the same virtual connection. In addition, each cell room 32 has a corresponding copy index indicating how many destination ports remain to be served for a cell in that room 32 (allowing a multicast to more than one output port). When a cell leaves a cell room 32 through the transmission control circuit 40, the cell room address is added to the empty room queue 38 permitting that cell room to be reassigned.

Arriving ATM cells are first sorted by their virtual connections, and each group of cells for a single virtual transmission are stored in the memory 34 in a FIFO manner to preserve the transmission order. The tag control unit 44 receives a tag for each VC that indicates the unique address for the head cell in that VC which is stored in the cell memory 34. Remaining cells in any active VC are linked to the head cell (and therefore to the tag). Tags for the VCs are sorted according to their destination port j, forming the j=M virtual destination port queues. The priority value in each tag allows sorting by the third priority value dimension. Thus, higher priority VCs are sorted ahead of lower priority VCs for each of the j=M destination port queues maintained by the control unit 44. The $a_{ij}$ priority levels are then calculated for the highest priority value VCs in each of the j=M virtual destination port queues. It is these $a_{ij}$ entries that are shifted into the cell scheduler 14 by each input queue 12.

Each queue completes an ATM switching operation to route a selected transmission set of cells as a two-phase operation conducted during the time necessary to complete transmission of a previously selected set of cells (a current transmission cycle). In the first phase each of the plurality of i=N parallel input queues 12, shifts head $a_{ij}$ entries for each of its j=M virtual queues to form a traffic matrix A (see FIG. 1). At the same time, the cell scheduler 14 indicates, to the i=N input queues 12, a currently selected transmission set of winning cells to be transmitted in the current transmission cycle. In a second phase, the cell scheduler 14 processes the traffic matrix A formed by the $a_{ij}$ entries shifted into the cell scheduler during the first phase, and completes its scheduling operation while transmission of cells occurs in the current transmission timing. In sum, a present scheduling operation is conducted in parallel with transmission of a previously selected set of cells.

Cell Scheduling Operation

Referring now to FIGS. 3–6, a cell scheduling operation will be with respect to the exemplary 4×4 cell scheduler 14, which includes an associated tie-break circuit 68. Inputs 48 of the cell scheduler 14 communicate with 4 input queues 12, and outputs 46 are routed to 4 output ports. Each of the inputs 48 includes a line for receiving $a_{ij}$ values from the cell scheduler, and an output 46 for indicating winning entries to the input queues 12.

Constant current sources 50 and 52 respectively provide a constant current $I_N$ to each of the four column and row current lines 54 and 56. Each of the processing units 16 includes separate column and row current dividers 58 and 60, and communicates with a particular column line control unit 62 and a particular row line control unit 64.

The cell scheduler 14 implements an iterative strategy to schedule cells by choosing particular entries in the traffic matrix A so that remaining ports are left with maximum satisfactory opportunities for transmission according to a chosen priority function for calculating $a_{ij}$. This strategy recognizes that a selection of a particular input port and output port for a transmission in a given transmission cycle prevents other input ports from communicating with the same output port during the same transmission cycle.

The cell scheduler 14 chooses a transmission set of cells from a traffic matrix A by iteratively choosing cells having the highest calculated weight $w_{ij}$. After each step in the iterative selection process, rows and columns having an entry $a_{ij}$ selected as a winner because of its calculated weight are removed from further contention to form a reduced traffic matrix A'. A subsequent step in the iterative process chooses cells having the highest calculated weight $w_{ij}$ from the reduced traffic matrix A'. The iterative selection process terminates after either no entries $a_{ij}$ remain in the traffic matrix, or all rows and columns have been eliminated from the traffic matrix. In an N (input port)×N (output port) traffic matrix formed from an N×N scheduler 14, up to N iterations are required.

More specifically, the iterative process is described by the following equations where N is the size of the switch for a cell scheduler having $N^2$ processing units 16, and m is the size of the reduced traffic matrix A' after each iteration. Initially, m=N, and A'=A. The value of $w_{ij}$ is determined during each iteration based upon the set of $a_{ij}$ entries currently in the cell scheduler 14 as follows:

$$wr_i = \sum_{j=1}^{m} a_{ij}, \quad (1)$$

$$wc_j = \sum_{i=1}^{m} a_{ij}, \quad (2)$$

$$w_{ij} = \left\{ \frac{a_{ij}}{wr_j} + \frac{a_{ij}}{wc_j}; \text{ if } a_{ij} \neq 0; \text{ and } = 0; \text{ otherwise.} \right. \quad (3)$$

During each iteration, the entry weight $w_{ij}$ is assigned to every entry remaining in the reduced traffic matrix A' and the entry with the heaviest weight is selected as the winner. Multiple entries can be selected as winners in a single iteration if they have an equal heaviest weight $w_{ij}$ and do not reside in the same row or the same column. Once winning entries have been selected all remaining entries existing in a common row or column are removed from contention because only one cell per row, per column may be transmitted during any single transmission cycle. All remaining outstanding entries $a_{ij}$ form the updated traffic matrix A' used in a subsequent iteration. If the heaviest weight in any reduced traffic matrix is zero, iteration terminates immediately. Iteration otherwise terminates when results for all entries have been obtained, e.g. when every row and column originally containing entries have had a winning entry chosen therefrom.

Figure 4:
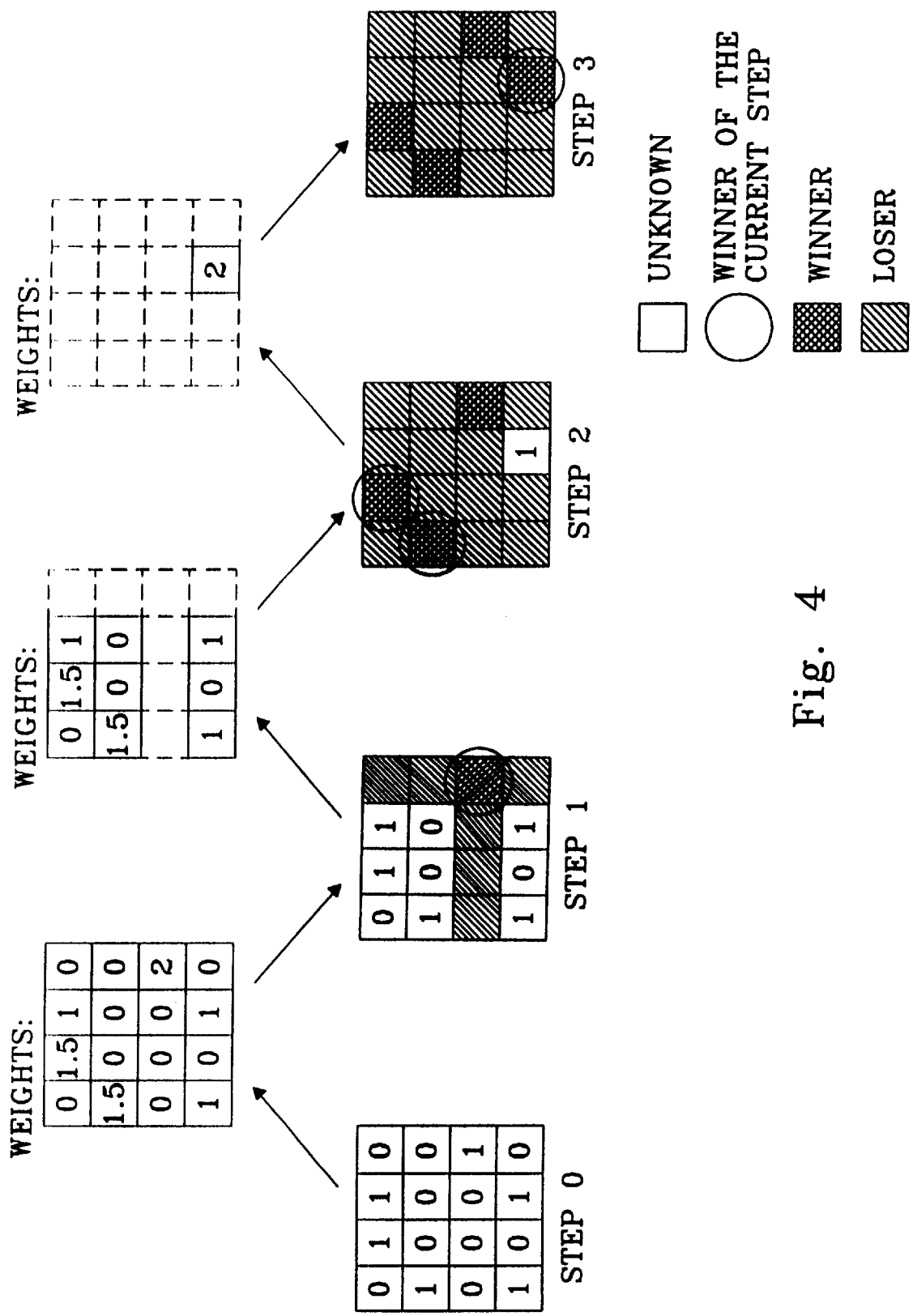
FIG. 4 illustrates an iterative selection process conducted by the cell scheduler on a traffic matrix representing the highest priority cells currently queued for transmission.

An exemplary iterative selection process is shown in FIG. 4, where the entries $a_{ij}$ are single digit binary entries. This constraint means that the winner during each iteration is the cell located at the row and column having the least flexibility. In the first step, the winning entry (i=3,j=2) had calculated weight of 2. This entry is declared the winner, and all entries in a common row and column are removed from contention in step 2. The iteration terminates in step 3 when all entries have been removed from contention or declared as winners.

As illustrated in Step 2, multiple winning entries (2,1 and 1,2) may be chosen in a single step if they do not share a common row or column. If any step results in a tie between entries in a common row or column, a tie-break process is conducted by a tie-break unit 68 shown generally in FIG. 6a, after the scheduler 14 concludes its operation. The tie-break unit comprises a pattern circulation control circuit 74 and a tie-break matrix (TBM) 75. Assume an original traffic matrix results in preliminary solution from the scheduler including tied entries 70. The tie-break circuit operates as an N step tie-break step and an N shifting steps shifting operation (where N is the size of the N×N cell scheduler) to resolve ties. The number of shifting steps is equal to the number of output ports (e.g. M for an N×M switch), while the number of tie-break steps is the larger of the number of input and output ports. Entries of the preliminary solution are right shifted column-wise through the TBM, which performs the tie-break function using a pattern defined by the letters M corresponding to designated master units 72 that form the physical tie-break matrix circuit 75. Matrices to the right and left sides of the TBM comprise a single physical matrix 75, with the matrix to the right indicating the final selection state with the ties broken using the pattern circulation circuit 74 and master units 72.

Each TBM master unit 72 is a state machine having three states (described below): Mopen, Mclose, Slave. Initially, N of the N×M units 72 in separate columns (the number of units is 4×4 for a 4×4 cell scheduler) are selected by the PCC circuit 74 to be set to Mopen, and all others are set to the Slave state. Each of the N×N master unit 72 which forms the TBM operates in one of three modes under control of the pattern circulation circuit 74:

Mopen—is the initial state of a unit 72. The unit 72 is transparent when a loser is shifted through and does not affect other units in the same column. However, when a winner is shifted through an Mopen unit, it will block other Slave units SU in the same column so that no more winners can shift through this column. After a winner is shifted through, the Mopen unit changes to a Mclose state.

Mclose—is the final state of a unit. An Mclose unit does not affect other units in the same column, but does not allow any winner to be shifted through the unit.

Slave is a unit that is transparent to all winners and losers shifted through, but forces a passing winner to lose when a unit of the same column is still in the Mopen state and another winner is shifted through the other unit simultaneously.

Each unit 72 has four I/O signals. Master/Slave is from the pattern circulation circuit and defines whether the unit is an M unit (either opened or closed) or a S unit. Win/lose is connected to the solution matrix, or the output of a previous unit 72 in the column or the row. Column-status is a bidirectional signal shared by all units of a column and indicates whether a winner is passing though the unit. The column-status signal is only active in the Mopen state when the win/lose line shifts in a '1' indicating a win. Out indicates the tie-break result for each unit. In operation, each unit 72 shifts in a bit from the left via win/lose. A TBM 72 in the Mopen state will transform to Mclose just after a first '1' is shifted in. The Mclose unit shifts out the '1' which caused it to close, but transforms all subsequent '1's to '0' and causes any other '1's shifted into the Mopen unit to lose, thereby preventing any row from having more than one '1'. One winner per column is also assured because only N units in separate columns were set to Mopen by the PCC 74 to commence a tie break operation and slave units receiving a '1' at the same time as a Mopen unit in the same column lose. Each TBM unit 77 shifts its output to the right to a next unit's win/lose input.

After N clock cycles, all bits from the preliminary solution have been shifted through a master unit (Mopen or Mclose) exactly once. Those shifted into Mclose units lose. Another N clock cycles shift the winning indications out to the cell scheduler 14 and input queue 12, with zeros replacing previous winning entries that were forced to lose in the tie-break circuit 68. Thus, the tie-break circuit 68 provides a circuit that does not effect any winners that are not tie-involved, and selects winners from tie-involved rows and columns randomly. Interconnection counts are low because signals of each unit are connected to its neighbors, except the master slave which is connected to the pattern circulation circuit 74. The end result is returned to the scheduler 14 and input queue 12 with ties broken.

Figure 5:
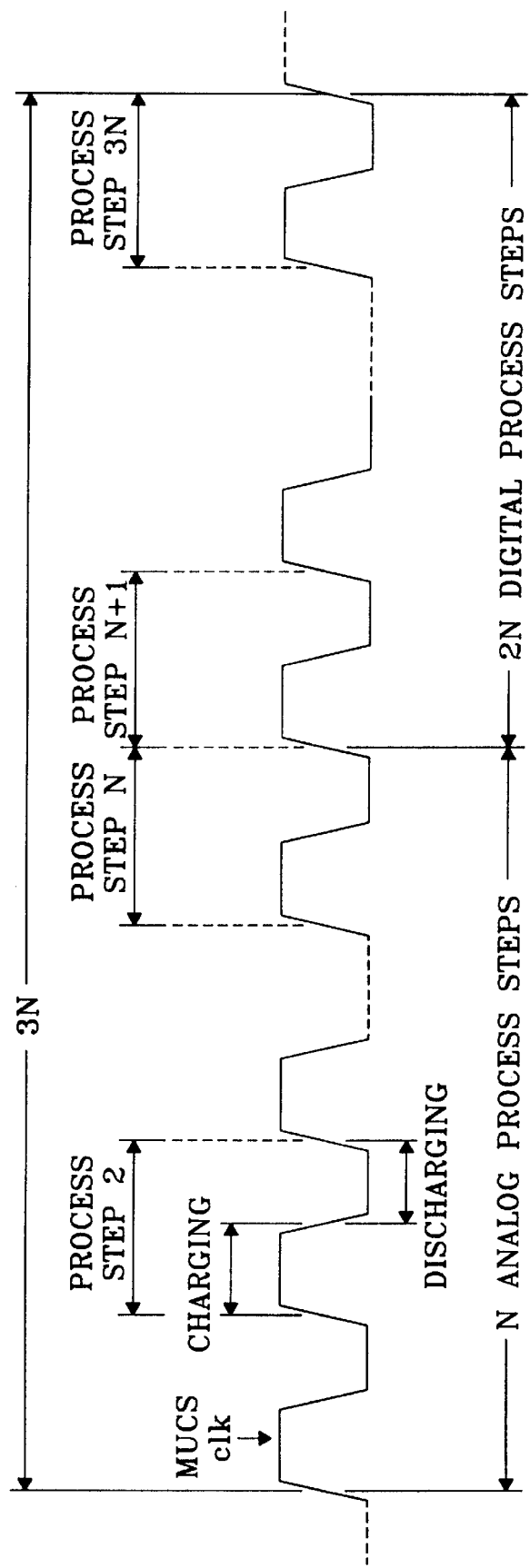
FIG. 5 shows the general timing diagram for a preferred cell scheduler of the present invention.
Figure 6A:
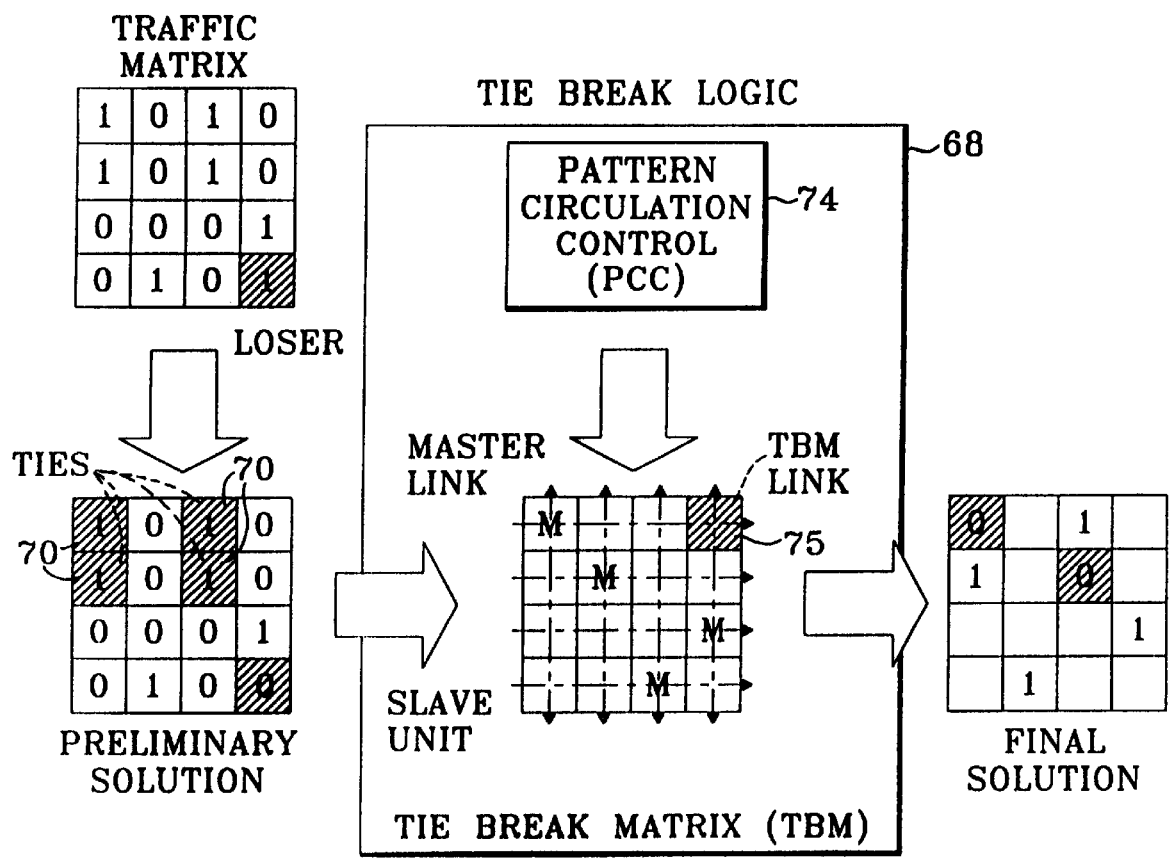
FIG. 6a is a logic diagram of a tie break unit for the cell scheduler of the present invention.
Figure 6B:
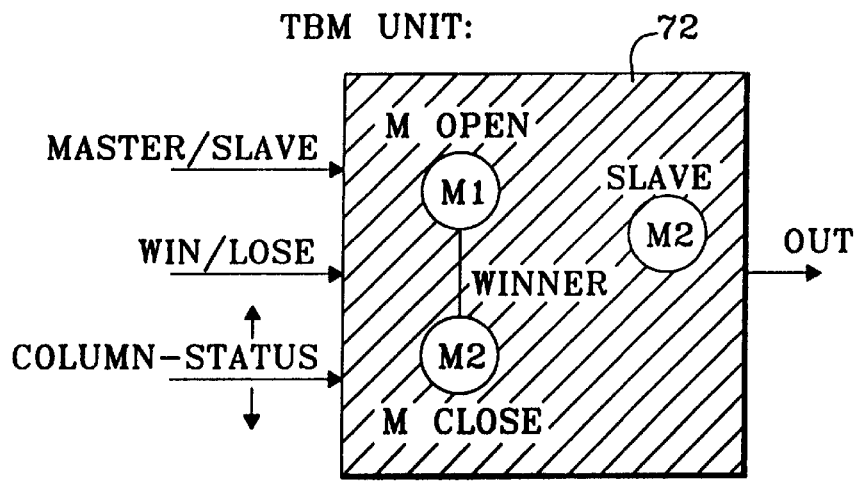
FIG. 6b is a block diagram of an individual tie break matrix unit that forms a tie break matrix in the tie break unit.

FIG. 5 shows the timing of the N tie-break steps and N shifting steps as being executed subsequent to the N steps conducted by the cell scheduler 14 which determined a preliminary solution including the ties 70. The total possible steps for the iterative selection process are therefore 3N for an N sized (N×N) switch. These 3N steps should correspond to the time necessary to transmit a previously selected group of cells to their respective output ports.

Figures 3A, 3B:
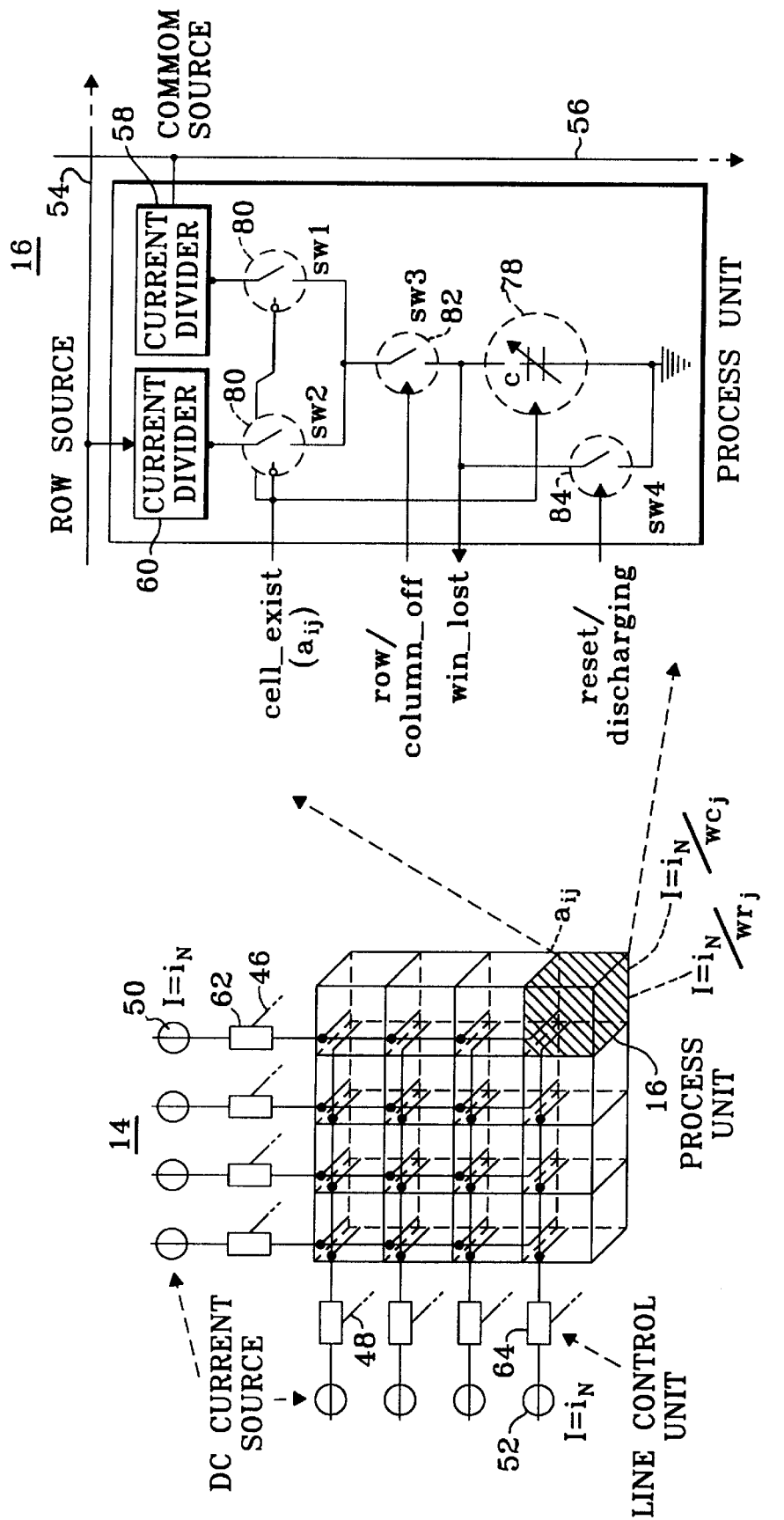
FIG. 3a is a functional diagram of a cell scheduler constructed in accordance with the present invention.
FIG. 3b shows a block diagram of an individual processing unit of the cell scheduler.

Particular clock cycles in the processing conducted by the individual processing units 16 of the cell scheduler will now be discussed with reference to FIGS. 3b and 5. At process step 2, the two separate cycles of a process unit involve charging and discharging of a capacitor 78 in any process units having an entry $a_{ij}$ therein. Switches 80 permit operation of an individual processing unit 16 when a cell exists, as indicated by an input line control unit 64. Closing of the switches 80 causes the row current divider to drain a DC current $I_N/wr_i$ (Equation 1) from a respective row current source 52, while the column current divider draws a DC current $I_N/wc_j$ (Equation 2) from a respective column current source 50. Another switch 82 is closed at commencement of a cell scheduling iterative process for all processing units 16, while a discharge switch 84 driven by a line control unit 64 is open for all processing units. In this condition, the capacitor 78 is allowed to charge in correspondence to the drained currents, which are proportional to the weight $w_{ij}$ of the entry in the processing unit 16.

The process units in the traffic matrix having the heaviest weight will reach a higher voltage than other process units during a charging period causing respective line control units 64 and 62 to open the switches 82 in any row and column including winning entries to remove those rows and columns from further contention. All other units 16 in a row or column including one or more winning cells are thus forced to lose by the line control units 62 and 64 which discharge losing entries by opening their discharge switches 8. This completes a charging process, and remaining rows and columns are reset when the line control units 62 and 64 close the discharge switch 84 to drain capacitors 78 in remaining rows and columns and then immediately opens the switch 84 to commence the next of up to N steps in the iteration. Each of the N-steps conducted by the process units 16 of the cell scheduler 14 therefore include separate charge and discharge periods. Upon conclusion of the N-steps, the tie-break process is commenced by the tie-break circuit 68 to resolve conflicts in those rows and columns, including multiple winning entries.

Figure 7:
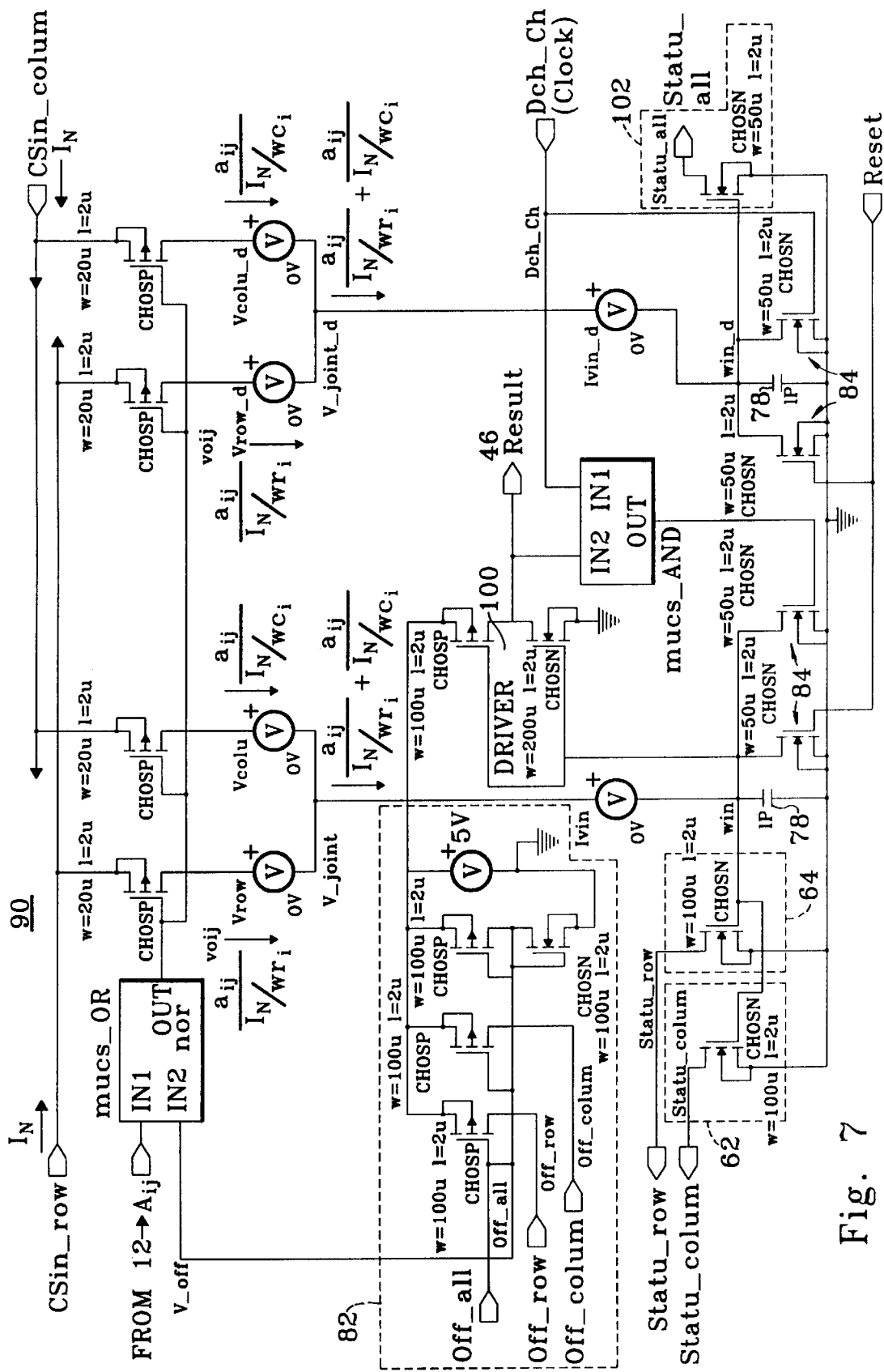
FIG. 7 is a circuit for implementing a process unit of the cell scheduler.

FIG. 7 is a schematic for a circuit 90 implementing an individual process unit 16. The schematic is drawn to the maximum throughput embodiment of the invention, where $a_{ij}$ is a single digit binary value, thus constant capacitors are used in the design. Two capacitors 78 are used, each having the drawn combined row and column current passed therethrough. The left capacitor drives other process units when the voltage required to drive a win-indicating driver 100 to produce the win/lose output 46 is reached. When this happens, the switches 82 in the same row and column are opened, so the row and column including one or more winners are withdrawn from further contention. At the same time, the status output 102 drives reset switches for rows and columns left in further contention. Remaining elements are labeled consistently with FIGS. 3a and 3b. $V^+$ in the circuit 90 represents test locations for ensuring current source performance, but are not physical elements of a constructed process unit 16.

The cycle time of the unit 16 is proportional to the capacitance at 78, e.g. inversely proportional to the value of the capacitor 7. The circuit illustrated in FIG. 7 uses 2 $\mu$m CMOS technology, and has been tested to have a response time of 100 ns. This corresponds to a throughput of approximately 128 Gb/s for a 32×32 ATM switch. Smaller value capacitors should result in faster processing times. Similarly, reducing the feature size (gate width and length) of transistors used in the circuit 90 would reduce transistor switching times to also increase speed.

FIG. 8 shows a scaled implementation of 4×4 process units, labeled as MUCS (matrix unit cell scheduling modules). The individual circuit modules 90 are coupled together to form the 4×4 cell scheduler 14. The 4×4 implementation receives $a_{ij}$ entries from separate input queues 12 at its input terminals 48, and outputs the results to the same input queues 12 through its outputs 46.

Thus, the present invention provides an efficient high-throughput ATM switch having an input queued structure. It will be appreciated by those skilled in the art that changes and modifications may be made to the preferred embodiment without departing from the invention in its broader aspects and as set forth in the following claims.

What is claimed is:

1. An asynchronous mode transmission switch comprising:

a plurality of input ports;

a plurality of output ports, each in switched connection as a destination port for a cell transmitted from any one of said plurality of input ports;

an input queue for receiving and queuing ATM cells from said plurality of input ports for scheduling to designated ones of said plurality of output ports; and a matrix cell scheduler, said scheduler forming a first traffic matrix having rows corresponding to said input ports and columns corresponding to said output ports, said first matrix including entries corresponding to cells queued in said input queue and iteratively choosing entries to be routed to their designated output ports during a next transmission timing by successively selecting a winning entry during each step of said iteratively choosing while removing rows and columns including winning entries from further contention during subsequent steps.

2. The asynchronous mode transmission switch according to claim 1, wherein said first traffic matrix includes multiple entries corresponding to cells from a single one of said input ports if said input queue has cells from said single one of said input ports which are queued for transmission to more than one of said plurality of output ports.

3. The asynchronous mode transmission switch of claim 2, wherein said cell scheduler calculates a weight for each traffic matrix entry based upon any other entries existing in a common row and column, and chooses an entry having the highest calculated weight as the winning entry during each step in the iterative choosing.

4. The asynchronous transmission mode switch according to claim 3 wherein:

said input queue comprises a plurality of queues respectively corresponding to said plurality of input ports and receiving cells therefrom, each of said input queues receiving cells from a single input port, sorting cells according to their designated output port and queuing multiple cells designated for individual output ports in order of an externally set priority level, said input queue calculating a priority level for each individual output port based upon cells in the input queue destined therefor and transmitting said calculated level to said cell scheduler as said entries in said first traffic matrix.

5. The asynchronous transmission mode switch according to claim 2 herein:

said input queue comprises a plurality of queues respectively corresponding to said plurality of input ports and receiving cells therefrom, each of said input queues receiving cells from a single input port, sorting cells according to their designated output port and queuing multiple cells designated for individual output ports in order of an externally set priority level, said input queue calculating a priority level for each individual output port based upon cells in the input queue destined therefor and transmitting said calculated level to said cell scheduler as said entries in said first traffic matrix.

6. The asynchronous transmission mode switch according to claim 3, wherein said cell scheduler chooses multiple winning entries during a single step if multiple entries have an identical calculated weight and do not exist in a common row or column of said first traffic matrix.

7. The asynchronous transmission mode switch according to claim 6, wherein said cell scheduler removes winning entries chosen during any step and any entries existing in a common row and column with said winning entries to form a reduced traffic matrix consisting of remaining entries in said first traffic matrix, and chooses from a reduced traffic matrix during a subsequent step.

8. The asynchronous transmission mode switch according to claim 7, wherein said cell scheduler continues iteratively choosing winning entries until winning entries have been chosen for each row and column of said first traffic matrix which included entries received from said plurality of input queues.

9. The asynchronous transmission mode switch according to claim 6, wherein said cell scheduler further comprises:
tie break means for randomly choosing among any entries which have an identical weight during a single step if said entries which have an identical weight exist in a common row or column of said first traffic matrix sQ that only one winning entry per row per column of said first traffic matrix is declared.

10. The asynchronous transmission mode switch according to claim 3, wherein the weight of individual entries in said first traffic matrix and reduced traffic matrices is calculated by said cell scheduler during each step of said iterative choosing and is defined by:

$$wr_i = \sum_{j=1}^{m} a_{ij},$$

$$wc_j = \sum_{i=1}^{m} a_{ij},$$

$$wr_{ij} = \left\{ \frac{a_{ij}}{wr_i} + \frac{a_{ij}}{wc_j}; \text{if } a_{ij} \neq 0; \right.$$

=0; otherwise
wherein
wr$_i$=row weight
wr$_j$=column weight
i=row counter
j=column counter
m=traffic matrix size after each iteration
a=traffic matrix entry.

11. The asynchronous transmission mode switch according to claim 3, wherein said cell scheduler comprises an N×M array of processing units, N is equal to a number of said plurality of input ports and M is equal to a number of said plurality of output ports, and each of said processing units comprises:
a row current divider for drawing a portion of row current from a row current source, the portion of row current drawn being proportional to the calculated weight of an entry sent to said processing unit from one of said plurality of input ports through said input queue;
a column current divider for drawing a portion of column current from a column current source, the portion of column current drawn being proportional to the calculated weight of an entry sent to said processing unit from one of said plurality of input ports through said input queue; and
voltage charging means for developing a voltage over time in proportion to the amount of row current and column current drawn by said row and column current dividers.

12. The asynchronous mode transmission switch according to claim 11, wherein each of said processing units further comprises a row/column switch for turning off all other processing units in a common row or column of said first traffic matrix when said voltage developed by said voltage charging means reaches a predetermined value.

13. The asynchronous mode transmission switch according to claim 12, wherein each of said processing units further comprises:
a win indicator switch for indicating that an entry in said processing unit has won when said voltage developed by said voltage charging means reaches a predetermined value.

14. The asynchronous mode transmission switch according to claim 13, wherein each of said processing units further comprises:
reset means for resetting said voltage charging means to zero voltage when a step has concluded and said processing unit has not been removed from contention in subsequent steps.

15. The asynchronous mode transmission switch according to claim 14, wherein said cell scheduler completes iteratively choosing cells from said first traffic matrix while cells chosen from a previous traffic matrix are transmitted.

16. An asynchronous mode transmission switch comprising:
a plurality of parallel input queues for queuing cells received from corresponding individual ones of a plurality of input ports, said queues determining an externally set priority value for each cell received and sorting cells according to their priority value and destination;
a plurality of output ports serving as destinations for said cells; and
a cell scheduler for scheduling transmission of cells in said plurality of parallel input queues to said plurality of output ports for a queued set of cells corresponding to each of said output ports having higher priority values than other cells queued for each of said output ports in each of said input queues, said cell scheduler iteratively choosing a transmission set of transmission cells to be transmitted during a transmission timing in a number of steps from said queued set of cells by selecting cells during each of said steps having a highest calculated weight.

17. The asynchronous mode transmission switch according to claim 16, wherein said queued set of cells which said cell scheduler chooses from in a single iterative choosing process includes multiple cells from a single input port if any one of said plurality of parallel input queues has cells queued for transmission to more than one of said plurality of output ports.

18. The asynchronous mode transmission switch according to claim 17, wherein said weight is determined for each cell in said queued set of cells by summing a first ratio of the priority value for said each cell to a first total priority sum for cells in said queued set of cells which originate from a common input port and a second ratio of the priority value of said each cell to a second total sum for cells in said queued set of cells which are designated for a common output port as said each cell.

19. The asynchronous mode transmission switch according to claim 18, wherein each step in said iterative choosing by said cell scheduler comprises selecting a winning entry having the highest calculated weight from said queued set of cells, placing said winning entry in said transmission set of cells, and removing from contention for transmission during said next transmission timing any cells in said queued set of cells which originated from a common input port as said winning entry or are designated for a common output port.

20. The asynchronous mode transmission switch according to claim 19, wherein said cell scheduler completes selection of said transmission set of cells when all cells in said queued set of cells have been either placed in said transmission set of cells or removed from contention.

21. The asynchronous mode transmission switch according to claim 19, wherein multiple winning entries may be selected during a step in said iterative choosing if the entries have an identical highest calculated weight and neither originated from a common input port or are destined for a common output port.

22. The asynchronous mode transmission switch according to claim 21, wherein said cell scheduler comprises:
   a matrix unit cell scheduling module for selecting cells having a highest calculated weight during each step of said iterative choosing; and
   tie break means for randomly choosing among entries found to have an equal highest calculated weight during any step during said iterative choosing and which either originated from a common input port or are designated for a common output port.

23. The asynchronous mode transmission switch according to claim 18, wherein said cell scheduler comprises:
   a matrix unit cell scheduling module for selecting cells having a highest calculated weight during each step of said iterative choosing; and
   tie break means for randomly choosing among entries found to have an equal highest calculated weight during any step during said iterative choosing and which either originated from a common input port or are designated for a common output port.

24. The asynchronous transmission mode switch according to claim 23, wherein said matrix unit cell scheduling module comprises an N×M array of processing units, N is equal to a number of said plurality of input ports and M is equal to a number of said plurality of output ports, each of said processing units corresponding to a unique address in said array that is defined by an origination port and a destination port and each of said processing units comprises:
   a row current divider for drawing a portion of row current from a row current source, the portion of row current drawn being proportional to a calculated weight of an entry sent to said processing unit for a cell having an address designating said processing unit in said queued set of cells;
   a column current divider for drawing a portion of column current from a column current source, the portion of column current drawn being proportional to the calculated weight of an entry sent to said processing unit for a cell having an address designating said processing unit in said queued set of cells; and
   voltage charging means for developing a voltage over time in proportion to the amount of row current and column current drawn by said row and column current dividers.

25. The asynchronous mode transmission switch according to claim 24, wherein each of said processing units further comprises a row/column switch for turning off all other processing units in a common row or column in said traffic matrix when said voltage developed by said voltage charging means reaches a predetermined value.

26. The asynchronous mode transmission switch according to claim 25, wherein each of said processing units further comprises:
   a win indicator switch for indicating that an entry in said processing unit has won when said voltage developed by said voltage charging means reaches a predetermined value.

27. The asynchronous mode transmission switch according to claim 26, wherein each of said processing units further comprises:
   reset means for resetting said voltage charging means to zero voltage when a step has concluded and said row/column switch of processing unit has not been turned off.

* * * * *

UNITED STATES PATENT AND TRADEMARK OFFICE
CERTIFICATE OF CORRECTION

PATENT NO.   : 5,923,656
DATED        : July 13, 1999
INVENTOR(S)  : Duan et al.

It is certified that error appears in the above-identified patent and that said Letters Patent is hereby corrected as shown below:

Column 12, line 65, delete "herein:" and insert --wherein-- therefor

Column 13, line 32, delete "sQ" and insert

--so-- therefor

Column 13, line 53, after "wherein" insert

--;--

Column 1, line 5, insert new paragraph

--This invention was made with Government support under Grant No. ECD 89-43166 awarded by the National Science Foundation Engineering Research Center, and Grant No. MDA 972-94-1-0004 under Advanced Research Program Agency (ARPA) grant for Center for

UNITED STATES PATENT AND TRADEMARK OFFICE
CERTIFICATE OF CORRECTION

PATENT NO. : 5,923,656
DATED : July 13, 1999
INVENTOR(S) : Duan et al.

It is certified that error appears in the above-identified patent and that said Letters Patent is hereby corrected as shown below:

Optoelectronic Science and Technology (COST). The Government has certain rights in the invention.--

Column 2, line 60, delete "inputrequired" and insert --input-queued-- therefor

Column 3, line 67, delete "fuinction" and insert --function-- therefor

Figure 8A:
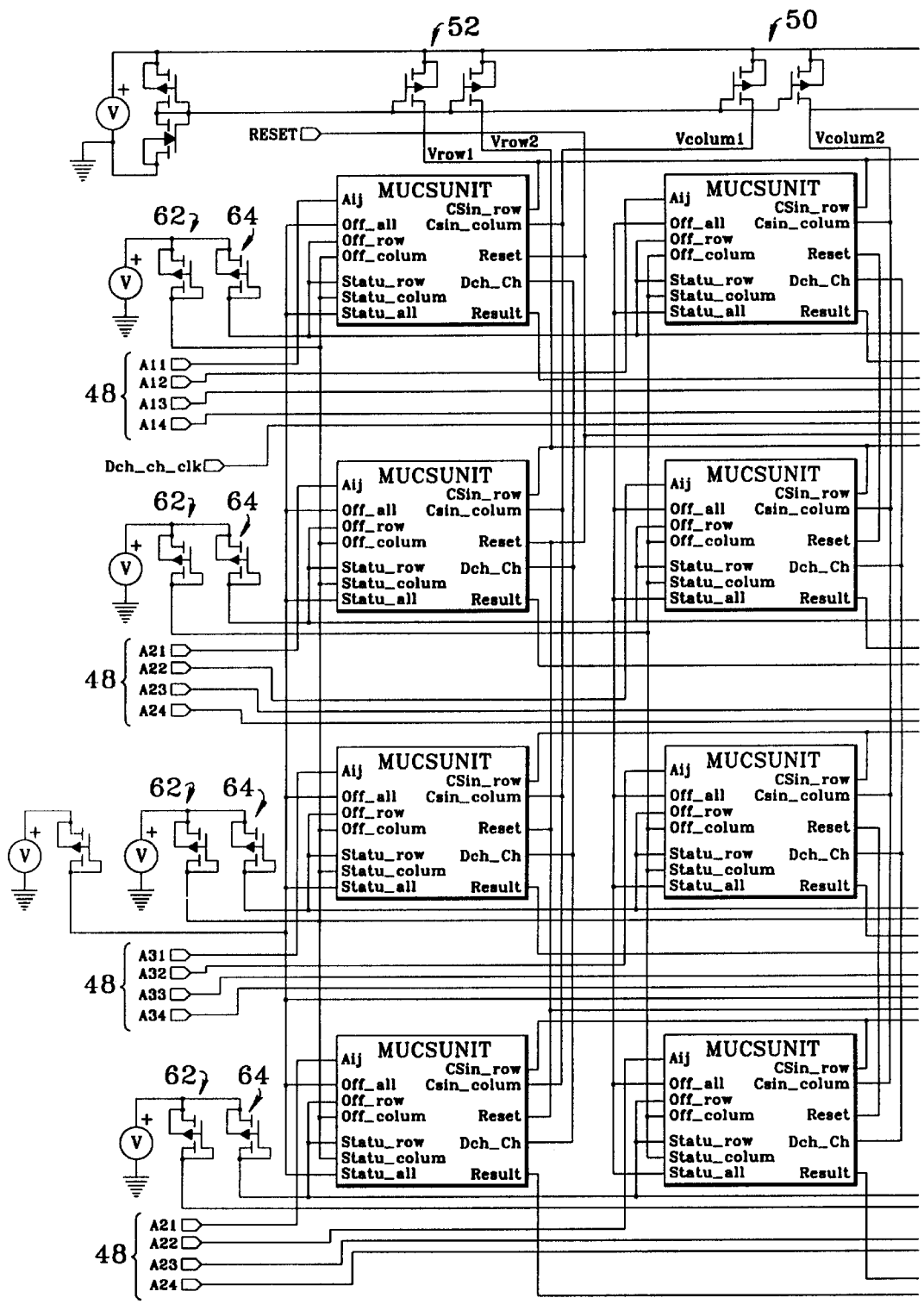
FIG. 8 is a schematic for a 4×4 implementation of the cell scheduler using the processing unit circuits shown in FIG. 7.
Figure 8B:
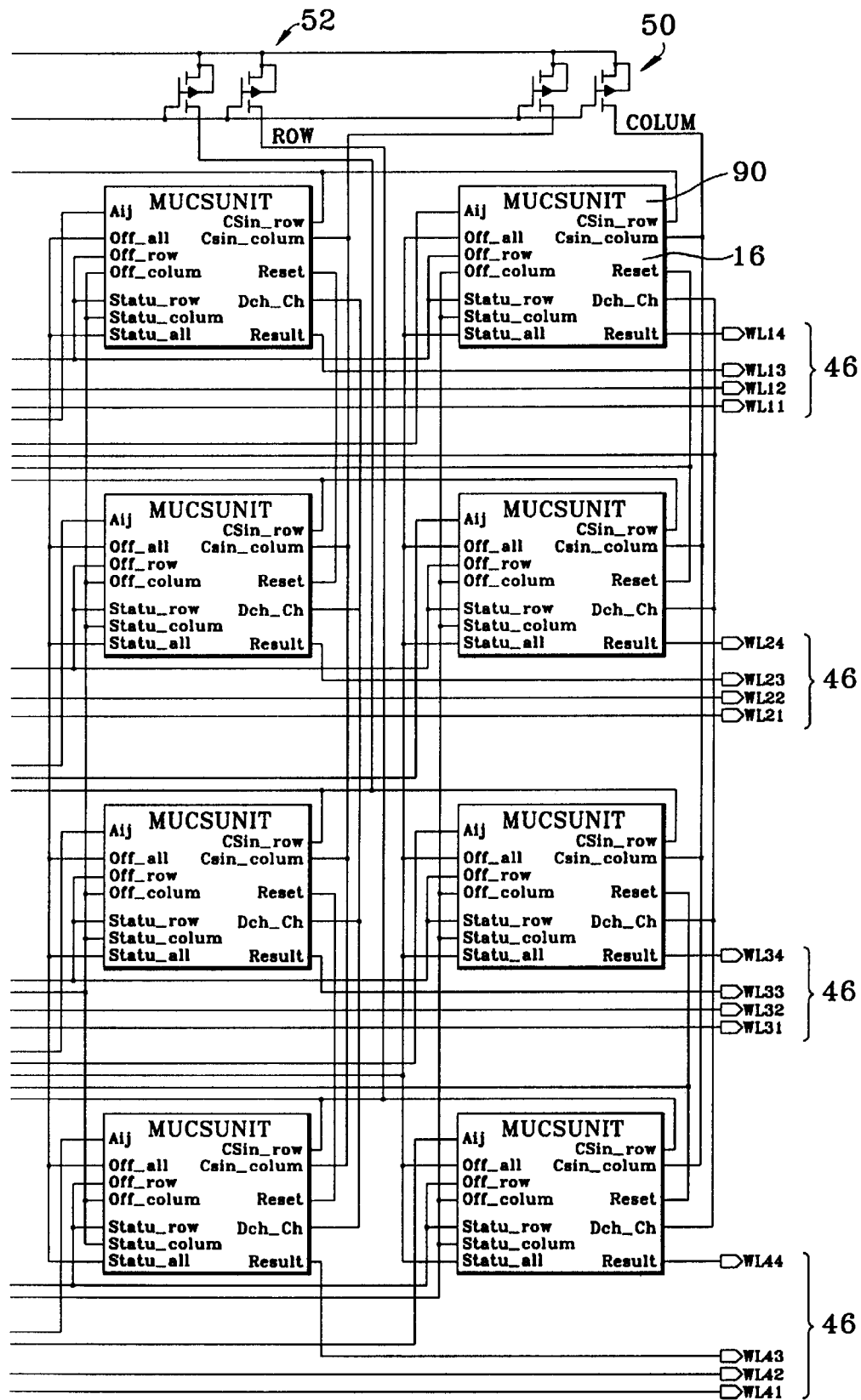

Column 5, line 23, delete "FIG. 8 is" and insert --FIGs. 8a and 8b are-- therefor

UNITED STATES PATENT AND TRADEMARK OFFICE
CERTIFICATE OF CORRECTION

PATENT NO. : 5,923,656
DATED : July 13, 1999
INVENTOR(S) : Duan et al.

It is certified that error appears in the above-identified patent and that said Letters Patent is hereby corrected as shown below:

Column 8, line 25, delete "$a_{ij}$." and insert

--$a_{ij}$-- therefor

Column 8, line 36 delete "$a_{ji}$" and insert

--$a_{ij}$-- therefor

Column 12, line 4, delete "FIG. 8 shows"

and insert --FIGs. 8a and 8b show-- therefor

Signed and Sealed this

Second Day of May, 2000

Attest:

Q. TODD DICKINSON

*Attesting Officer*    *Director of Patents and Trademarks*